United States Patent
Choi et al.

(10) Patent No.: US 11,743,941 B2
(45) Date of Patent: Aug. 29, 2023

(54) DYNAMIC GROUP FORMATION FOR GROUP BASED POSITIONING REFERENCE SIGNAL LISTEN BEFORE TALK PROCEDURES

(71) Applicant: QUALCOMM Incorporated, San Diego, CA (US)

(72) Inventors: Chang-Sik Choi, Seoul (KR); Kapil Gulati, Belle Mead, NJ (US); Gene Wesley Marsh, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 232 days.

(21) Appl. No.: 17/445,871

(22) Filed: Aug. 25, 2021

(65) Prior Publication Data

US 2022/0070924 A1    Mar. 3, 2022

Related U.S. Application Data

(60) Provisional application No. 63/070,498, filed on Aug. 26, 2020.

(51) Int. Cl.
*H04W 74/08* (2009.01)
*H04L 5/00* (2006.01)

(52) U.S. Cl.
CPC ....... *H04W 74/0808* (2013.01); *H04L 5/0048* (2013.01)

(58) Field of Classification Search
CPC ............. H04W 74/0808; H04W 72/12; H04W 72/1273; H04W 74/0841; H04L 5/0048; H04L 5/005; H04L 12/40039; H04B 7/0452
See application file for complete search history.

(56) References Cited

U.S. PATENT DOCUMENTS

| 11,102,814 B2 * | 8/2021 | Bhorkar ................. H04L 5/005 |
| 2019/0141744 A1 * | 5/2019 | Naghshvar ........... H04B 7/0452 |
| 2019/0174539 A1 * | 6/2019 | Siomina ............ H04W 72/1273 |
| 2020/0136857 A1 * | 4/2020 | Yun ................... H04L 12/40039 |

(Continued)

FOREIGN PATENT DOCUMENTS

| CN | 111279622 A * | 6/2020 | ........... H04B 7/0452 |
| WO | WO-2019061243 A1 * | 4/2019 | |
| WO | WO-2022032609 A1 * | 2/2022 | |

OTHER PUBLICATIONS

Lagan, Sandra, "New Radio Beam-based Access to Unlicensed Spectrum: Design Challenges and Solutions" arXiv: 1809.10443v2, Oct. 23, 2019 (Year: 2019).*

(Continued)

*Primary Examiner* — Ayaz R Sheikh
*Assistant Examiner* — Louis Samara
(74) *Attorney, Agent, or Firm* — Harrity & Harrity, LLP

(57) ABSTRACT

Various aspects of the present disclosure generally relate to wireless communication. In some aspects, a user equipment (UE) may receive, from an initiator UE, a group formation communication indicating a group that the UE is associated with for a group positioning reference signal (PRS) Listen Before Talk (LBT) procedure. The UE may transmit, to the initiator UE, an indication that the UE should not be associated with the group based at least in part on performing the group PRS LBT procedure. Numerous other aspects are provided.

30 Claims, 9 Drawing Sheets

(56) References Cited

U.S. PATENT DOCUMENTS

| | | | |
|---|---|---|---|
| 2020/0305174 A1* | 9/2020 | Ganesan | H04W 72/12 |
| 2022/0337299 A1* | 10/2022 | Sun | H04L 5/005 |
| 2022/0377810 A1* | 11/2022 | Bhamri | H04W 74/0841 |
| 2023/0054184 A1* | 2/2023 | Loehr | H04W 74/0808 |

OTHER PUBLICATIONS

Fraunhofer Iis, et al., "Uplink NR TDOA Design", 3GPP Draft, 3GPP TSG RAN WG1 Meeting 96, R1-1903053_NR_UTDOA, 3RD Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019 (Feb. 15, 2019), XP051600749, 16 Pages, Retrieved from the Internet: URL: http://www.3gpp.org/ftp/tsg%5Fran/WG1%5FRL1/TSGR1%5F96/Docs/R1%2D1903053%2Ezip [retrieved on Feb. 15, 2019] pp. 7-10, 4 Group Management for UL PRS Page 1, 1 Introduction.

International Search Report and Written Opinion—PCT/US2021/047704—ISA/EPO—dated Dec. 14, 2021.

Qualcomm Incorporated: "On Unlicensed and Applicable Use Cases", 3GPP Draft, 3GPP RAN #86, RP-192527, 3RD Generation Partnership Project (3GPP), Mobile Competence Centre, 650, Route Des Lucioles, F-06921 Sophia-Antipolis Cedex France, No. Sitges, Spain, Dec. 9, 2019-Dec. 12, 2019 Dec. 2, 2019 (Dec. 2, 2019), XP051834167, 12 Pages, Retrieved from the Internet: URL:https://ftp.3gpp.org/tsg_ran/TSG_RAN/TSGR_86/Docs/RP-192527.zip RP-192527 On Unlicensed Positioning and Applicable Use Cases.pdf [retrieved on Dec. 2, 2019] the whole document.

VIVO: "Remaining Issues on Rel-16 UE Features", 3GPP Draft, 3GPP TSG RAN WG1 #102, R1-2005361, 3RD Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020 Aug. 8, 2020 (Aug. 8, 2020), XP051917386, 9 Pages, Retrieved from the Internet: URL: https://ftp.3gpp.org/tsg_ran/WG1_RL1/TSGR1_102-e/Docs/R1-2005361.zip R1-2005361_Remaining issues on Rel-16 UE feature.docx [retrieved on Aug. 8, 2020] pp. 4-5, 4.Remaining Issues for Positioning UE Features pp. 5-6, 5.1, Basic Feature Group for NR V2X.

* cited by examiner

DYNAMIC GROUP FORMATION FOR GROUP BASED POSITIONING REFERENCE SIGNAL LISTEN BEFORE TALK PROCEDURES

CROSS-REFERENCE TO RELATED APPLICATION

This patent application claims priority to U.S. Provisional Patent Application No. 63/070,498, filed on Aug. 26, 2020, entitled "DYNAMIC GROUP FORMATION FOR GROUP BASED POSITIONING REFERENCE SIGNAL LISTEN BEFORE TALK PROCEDURES," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for dynamic group formation for group based positioning reference signal (PRS) listen before talk (LBT) procedures.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving, from an initiator UE, a group formation communication indicating a group that the UE is associated with for a group positioning reference signal (PRS) Listen Before Talk (LBT) procedure; and transmitting, to the initiator UE, an indication that the UE should not be associated with the group based at least in part on performing the group PRS LBT procedure.

In some aspects, a method of wireless communication performed by a UE includes transmitting, to one or more responder UEs, a group formation communication indicating a group that the UE and the one or more responder UEs are associated with for a group PRS LBT procedure; and receiving, from a responder UE of the one or more responder UEs, an indication that the responder UE should not be associated with the group.

In some aspects, a UE for wireless communication includes a memory and one or more processors, coupled to the memory, configured to: receive, from an initiator UE, a group formation communication indicating a group that the UE is associated with for a group PRS LBT procedure; and transmit, to the initiator UE, an indication that the UE should not be associated with the group based at least in part on performing the group PRS LBT procedure.

In some aspects, a UE for wireless communication includes a memory and one or more processors, coupled to the memory, configured to: transmit, to one or more responder UEs, a group formation communication indicating a group that the UE and the one or more responder UEs are associated with for a group PRS LBT procedure; and receive, from a responder UE of the one or more responder UEs, an indication that the responder UE should not be associated with the group.

In some aspects, a non-transitory computer-readable medium storing a set of instructions for wireless communication includes one or more instructions that, when executed by one or more processors of a UE, cause the UE to: receive, from an initiator UE, a group formation communication indicating a group that the UE is associated with for a group PRS LBT procedure; and transmit, to the initiator UE, an indication that the UE should not be associated with the group based at least in part on performing the group PRS LBT procedure.

In some aspects, a non-transitory computer-readable medium storing a set of instructions for wireless communication includes one or more instructions that, when executed by one or more processors of a UE, cause the UE to: transmit, to one or more responder UEs, a group formation communication indicating a group that the UE and the one or more responder UEs are associated with for a group PRS LBT procedure; and receive, from a responder UE of the one or more responder UEs, an indication that the responder UE should not be associated with the group.

In some aspects, an apparatus for wireless communication includes: means for receiving, from an initiator UE, a group formation communication indicating a group that the apparatus is associated with for a group PRS LBT procedure; and means for transmitting, to the initiator UE, an indication that the apparatus should not be associated with the group based at least in part on performing the group PRS LBT procedure.

In some aspects, an apparatus for wireless communication includes means for transmitting, to one or more responder UEs, a group formation communication indicating a group that the apparatus and the one or more responder UEs are associated with for a group PRS LBT procedure; and means for receiving, from a responder UE of the one or more responder UEs, an indication that the responder UE should not be associated with the group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
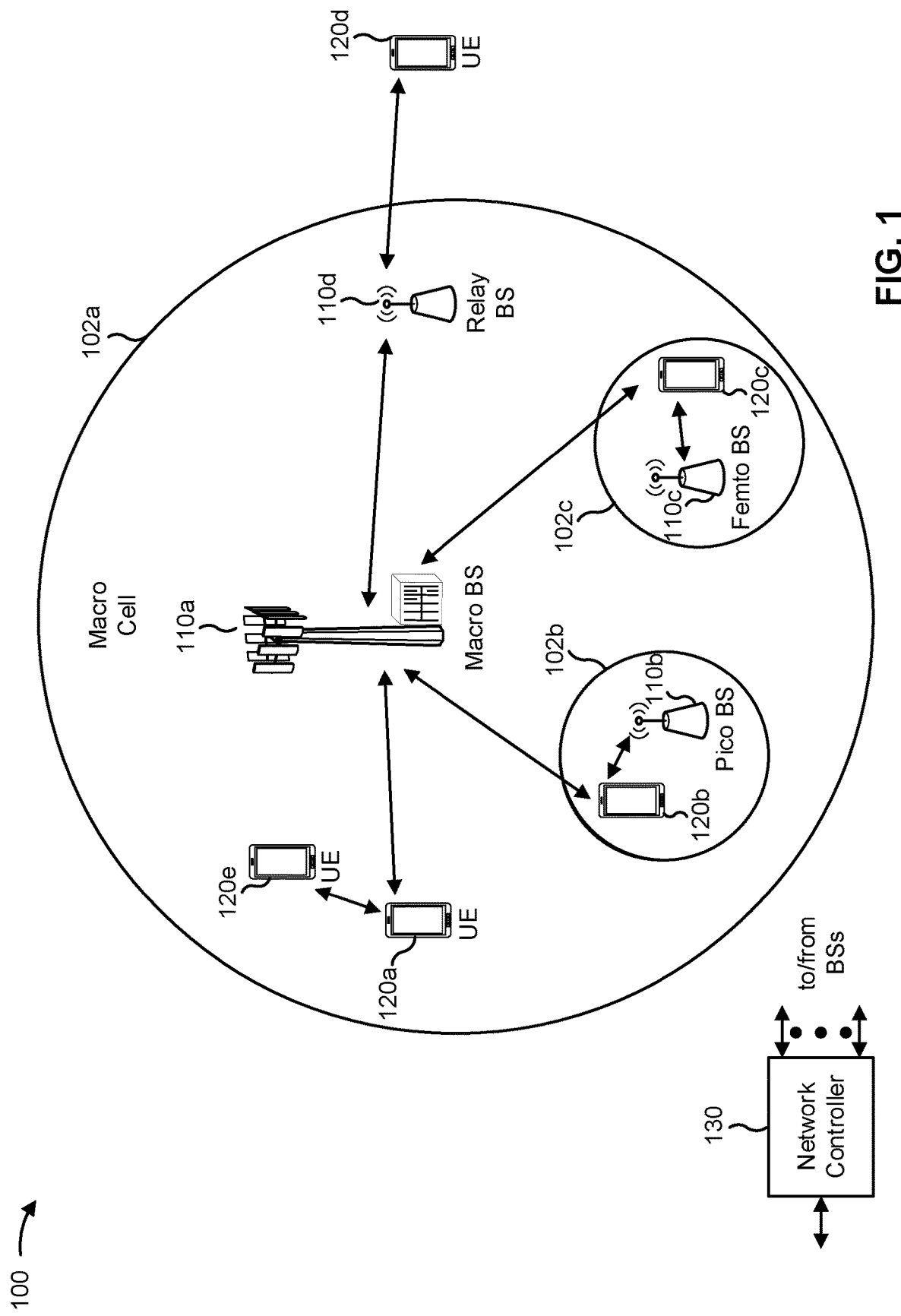
FIG. 1 is a diagram illustrating an example of a wireless network, in accordance with the present disclosure.

In some aspects, a user equipment (UE) communicating using a sidelink may utilize a positioning reference signal (PRS) to determine the location of a UE based at least in part on radio access network information. For example, the UE may perform a PRS exchange procedure with one or more other UEs. In some aspects, a PRS exchange procedure between UEs may be deployed in unlicensed spectrum (e.g., an unlicensed electromagnetic spectrum band). Prior to gaining access to, and communicating over, unlicensed spectrum, a wireless device may perform a listen before talk (LBT) procedure to contend for access to the unlicensed spectrum. An LBT procedure, sometimes referred to as a clear channel assessment (CCA) procedure, may include performing the LBT procedure to determine whether a channel of the unlicensed spectrum is available.

During a PRS exchange procedure, PRS transmission latency (e.g., a time between a transmission of a PRS from a first UE and a transmission of a second PRS from a second UE) is a significant factor for the accuracy of the determination of a position of a UE (e.g., using the PRS). A smaller PRS transmission latency results in a smaller clock drift, thereby resulting in a more accurate determination of a position of a UE. However, when deployed in an unlicensed spectrum, different UEs may experience different channel access availabilities. This may result in a larger PRS transmission latency during the PRS exchange procedure. Therefore, it may be beneficial to group UEs for the purposes of performing group based PRS LBT procedures.

However, in some cases, a responder UE may experience local interference (e.g., after group formation) that affects the channel access availability of the responder UE. For example, local interference experienced by a UE may vary over time due to a mobility of a responder UE in a dynamic environment, such as a responder UE associated with a vehicle. Additionally, or alternatively, local interference experienced by a responder UE may be persistent or periodic for responder UEs in a static environment, such as a responder UE associated with a roadside unit (RSU). As a result, the responder UE may be unable to access the channel of the unlicensed spectrum and transmit a PRS during the time slot reserved by the initiator UE. This may reduce the reliability and accuracy of the PRS exchange procedure as the responder UE may be unable to participate in the PRS exchange procedure.

Some techniques and apparatuses described herein enable dynamic group formation for group based PRS LBT procedures. For example, a responder UE may perform a group PRS LBT procedure. The responder UE may determine that the responder UE should not be associated with the group based at least in part on performing the group PRS LBT procedure (e.g., based at least in part on measuring a local interference level during the group PRS LBT procedure). The responder UE may indicate to the initiator UE that the responder UE should be removed from the group. The initiator UE may remove the responder UE from the group and update a list of the group members for upcoming PRS exchanges. As a result, a responder UE that experiences a local interference affecting the channel access availability of the responder UE may voluntarily opt out of a group before the end of a group formation cycle. This improves the reliability and accuracy of the PRS exchange procedure as the responder UE will not attempt to perform the LBT procedure and transmit a PRS when the responder UE is unable to access the channel of the unlicensed spectrum. Additionally, the likelihood of an LBT failure (e.g., due to local interference) by the responder UE is decreased.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, two or more UEs 120 may communicate (e.g., using one or more sidelink channels) to determine a position of a UE 120. For example, the UEs 120 may exchange PRSs to determine the location of a UE 120. The UEs 120 may use a time of transmission of a PRS and a time of reception of a PRS, among other information carried by the PRS, to determine the location of the UE 120.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, devices of wireless network 100 may communicate in an unlicensed electromagnetic spectrum band. Prior to gaining access to, and communicating over, an unlicensed radio frequency spectrum band, a device may perform an LBT procedure to contend for access to the unlicensed electromagnet spectrum band (e.g., to determine whether a channel of the unlicensed electromagnetic spectrum band is available).

As indicated above, FIG. 1 is provided as an example. Other examples may differ from what is described with regard to FIG. 1.

Figure 2:
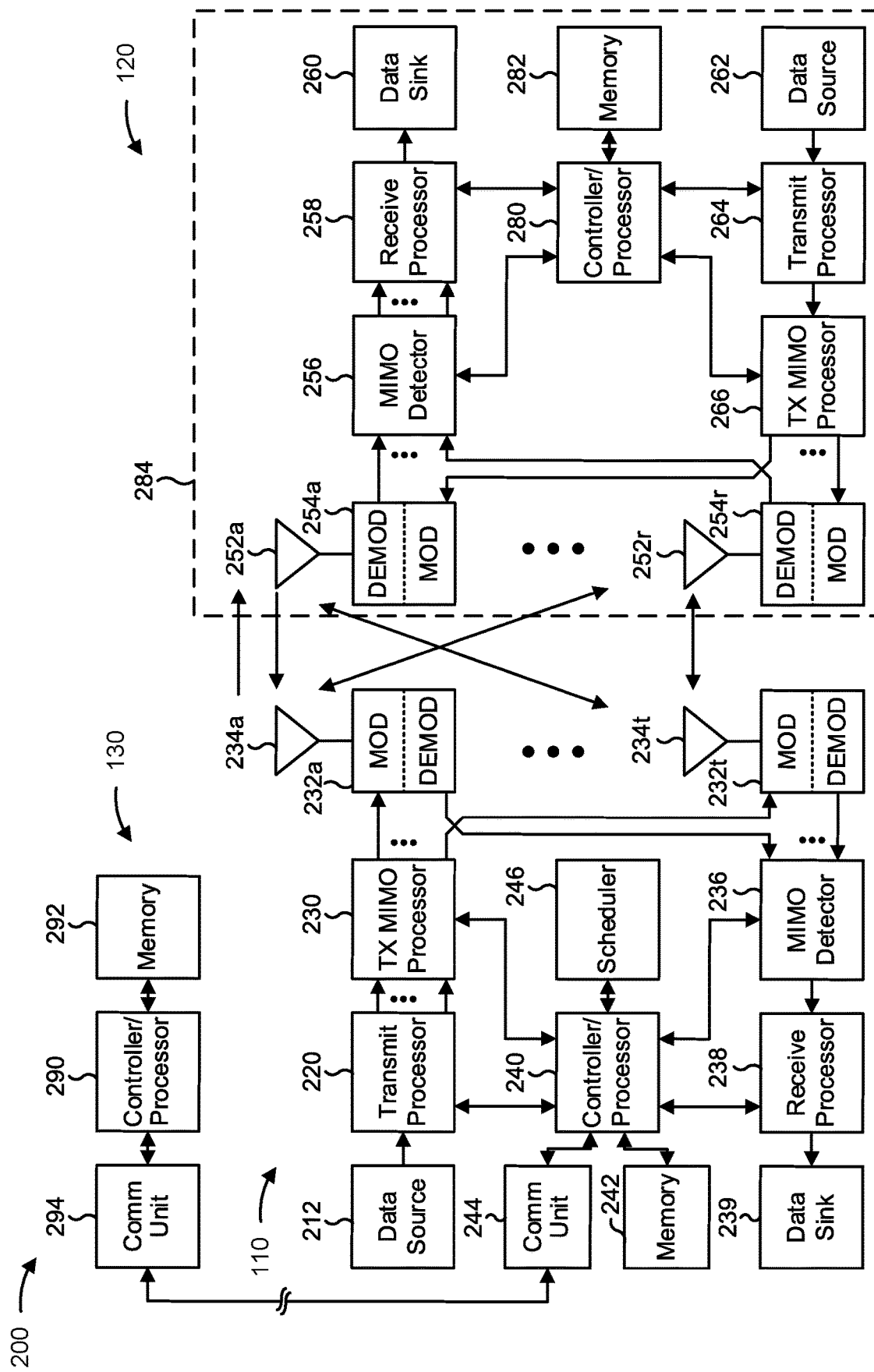
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with dynamic group formation for group based PRS LBT procedures, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a UE 120 (e.g., a responder UE 120) may include means for receiving, from an initiator UE 120, a group formation communication indicating a group that the UE 120 is associated with for a group PRS LBT procedure, means for determining that the UE should not be associated with the group based at least in part on performing the group PRS LBT procedure, means for transmitting, to the initiator UE 120, an indication that the UE 120 should not be associated with the group, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a UE 120 (e.g., an initiator UE 120) may include means for transmitting, to one or more responder UEs 120, a group formation communication indicating a group that the UE 120 and the one or more responder UEs 120 are associated with for a group PRS LBT procedure, means for receiving, from a responder UE 120 of the one or more responder UEs 120, an indication that the responder UE 120 should not be associated with the group, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
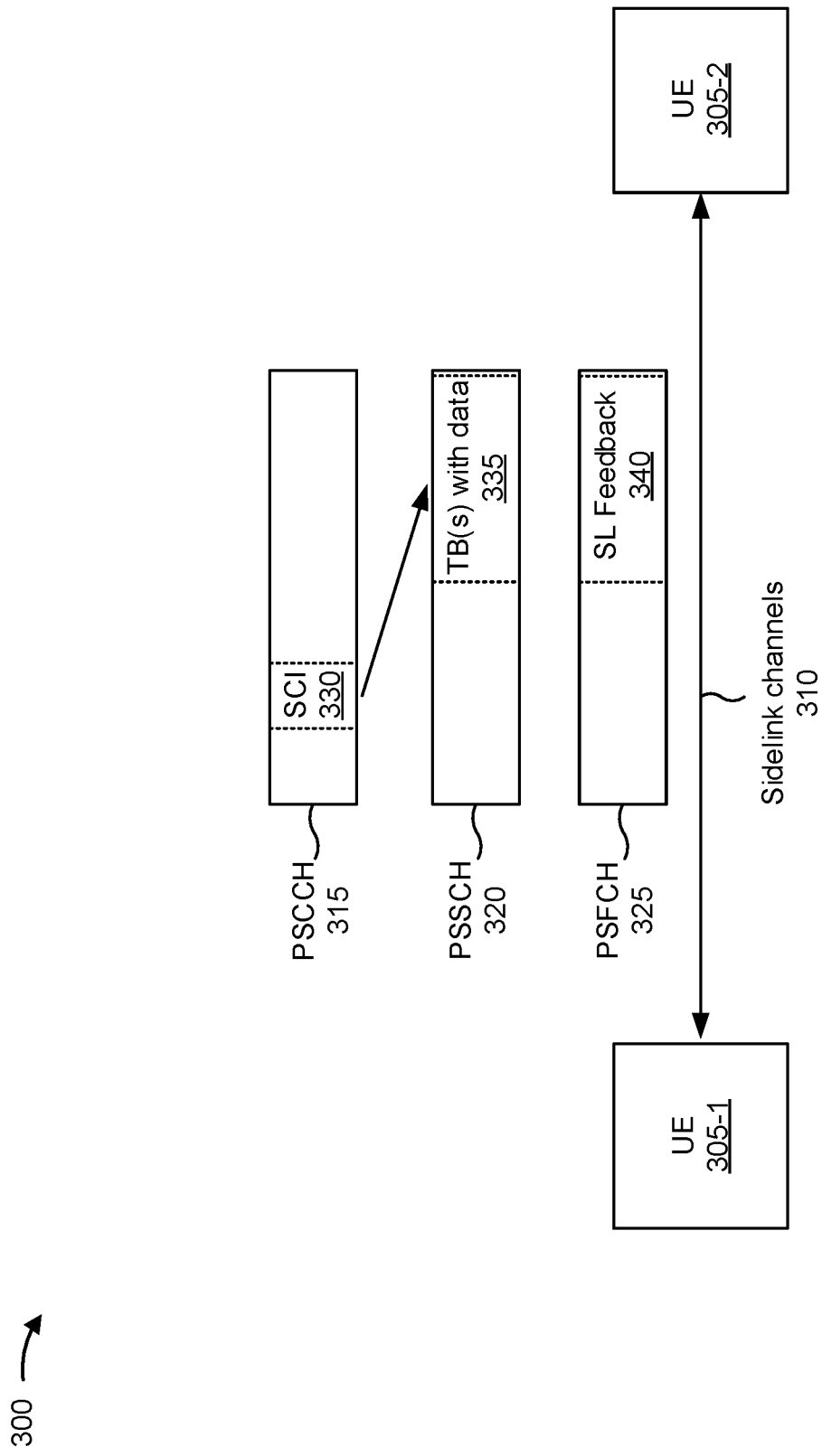
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle to pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
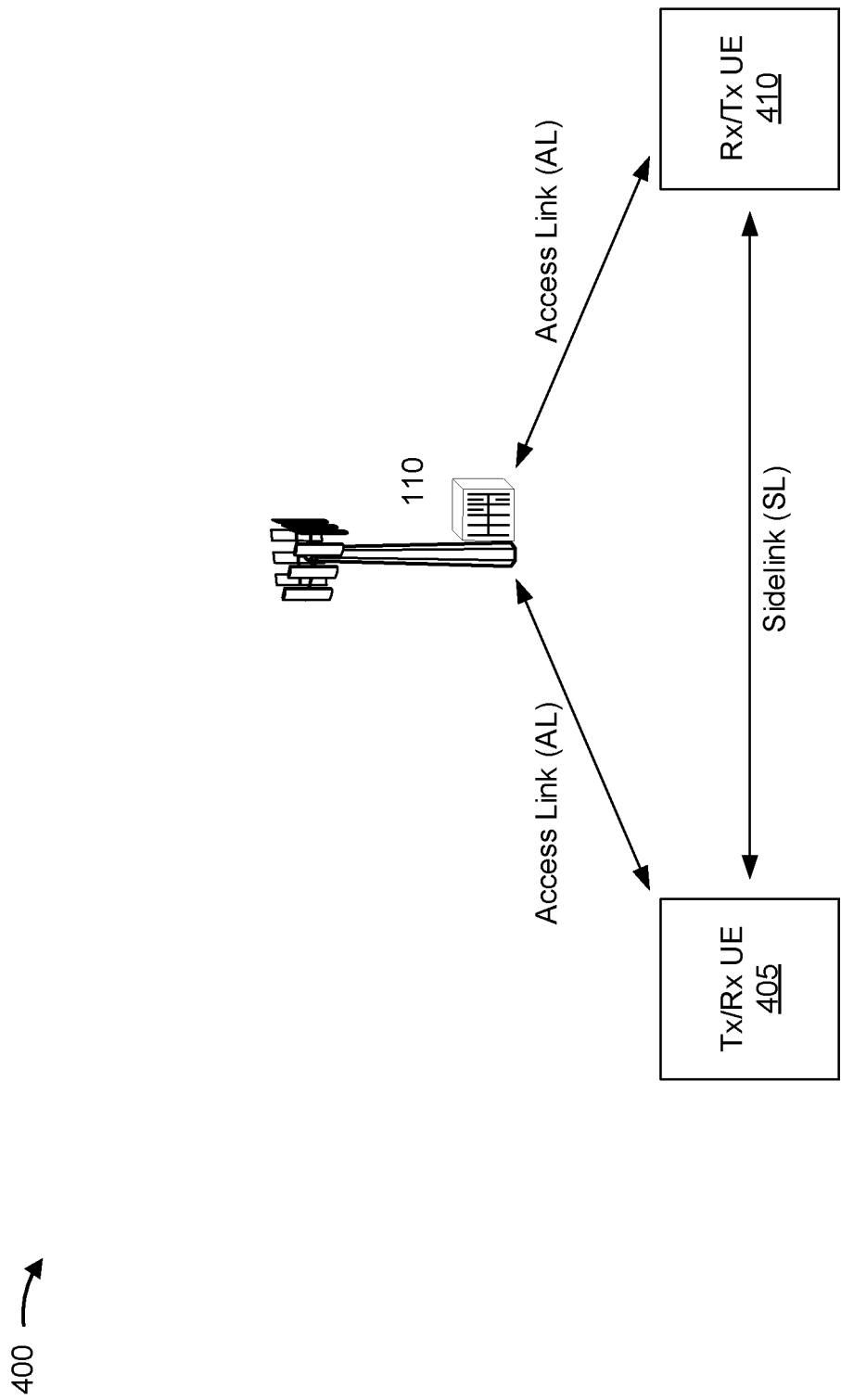
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In some cases, a UE 120 communicating using a sidelink may utilize a PRS to determine the location of a UE based at least in part on radio access network information. For example, the UE 120 may perform a PRS exchange procedure with one or more other UEs. In some examples, the UE 120 associated with a vehicle may exchange PRSs with one or more other UEs 120 associated with other vehicles and/or one or more UEs 120 associated with RSUs. The UE 120 associated with the vehicle or a UE 120 associated with an RSU may determine the location of the UE 120 associated with the vehicle based at least in part on one or more parameters associated with the PRS exchange procedure. The one or more parameters may include a time at which a PRS is transmitted by a transmitter UE 120, a time at which a PRS is received by a receiver UE 120, a location of a transmitter UE 120 at a time of transmission of a PRS, a measured clock error noise standard deviation (e.g., of a clock associated with the UE 120), a speed of a vehicle associated with the UE 120, a clock drift standard deviation, and/or the like. For example, a transmitter UE 120 and a receiver UE 120 may exchange PRSs and use a difference between a time of arrival and a time of departure to determine a range (e.g., a distance) between the transmitter UE 120 and the receiver UE 120.

In some examples, a PRS exchange procedure between UEs 120 may be deployed in unlicensed spectrum (e.g., an unlicensed electromagnetic spectrum band). For example, some RATs, such as NR, may allow operation in unlicensed spectrum. The NR RAT for unlicensed spectrum may be referred to as NR-Unlicensed (NR-U). Not all sub-bands in unlicensed spectrum may be available at all times. For example, some sub-bands may be occupied by other UEs 120, base stations 110, or other wireless nodes. Prior to gaining access to, and communicating over, unlicensed spectrum, a wireless device may perform an LBT procedure to contend for access to the unlicensed spectrum. An LBT procedure, sometimes referred to as a CCA procedure, may include performing the LBT procedure to determine whether a channel of the unlicensed spectrum is available. An LBT procedure may include detecting or sensing an energy level on the channel of the unlicensed spectrum and determining whether the energy level is below a threshold (e.g., a spectrum energy detection threshold). When the energy level is below the threshold, the LBT procedure is successful and contention to access the channel of the unlicensed spectrum may be successful. When the energy level exceeds the threshold, the LBT procedure is unsuccessful, and contention to access the channel of the unlicensed spectrum may be unsuccessful. Thus, coexistence between devices on non-centrally-scheduled channels, such as sidelink channels on the unlicensed spectrum, is enabled.

Example LBT categories include category one (Cat 1) LBT, category two (Cat 2) LBT, category three (Cat 3) LBT, and category four (Cat 4) LBT. In Cat 1 LBT, also referred to as no LBT, an LBT procedure is not performed prior to transmission of a communication on the channel. In Cat 2 LBT, the channel sensing duration is fixed (e.g., without random back-off). A 16 microsecond channel sensing duration is used for 16 microsecond Cat 2 LBT, and a 25 microsecond channel sensing duration is used for 25 microsecond Cat 2 LBT. In Cat 3 LBT, the channel sensing duration is fixed (e.g., a contention window has a fixed size), and random back-off is used. In Cat 4 LBT, the channel sensing duration is variable (e.g., a contention window has a variable size), and random back-off is used.

During a PRS exchange procedure, PRS transmission latency (e.g., a time between a transmission of a PRS from a first UE 120 and a transmission of a second PRS from a second UE 120) is a significant factor for the accuracy of the determination of a position of a UE 120 (e.g., using the PRS). A smaller PRS transmission latency results in a smaller clock drift, thereby resulting in a more accurate determination of a position of a UE 120. However, when deployed in an unlicensed spectrum, different UEs 120 may experience different channel access availabilities. This may result in a larger PRS transmission latency during the PRS exchange procedure.

Therefore, it may be beneficial to group UEs 120 for the purposes of performing group based PRS LBT procedures. For example, UEs 120 may be grouped with other UEs 120 that have similar channel access availabilities. A group may include an initiator UE 120 (e.g., a UE 120 that forms the group by broadcasting group formation communications) and one or more responder UEs 120 (e.g., a UE 120 that join the group based at least in part on responding to a group formation communication). Groups may be formed periodically (e.g., according to a group formation cycle). The initiator UE 120 may perform a Cat 4 LBT procedure that includes sensing the channel in the unlicensed spectrum and reserving a channel occupancy time (CoT) for all members of the group. A responder UE 120 may perform a Cat 2 LBT procedure during a time slot during the CoT (e.g., that was reserved for the responder UE 120 by the imitator UE 120) that includes a channel assessment in the unlicensed spectrum. The responder UE 120 may then broadcast a PRS after gaining access to the channel of the unlicensed spectrum. In this way, PRS transmission latency during a PRS exchange procedure deployed in the unlicensed spectrum may be reduced.

However, in some cases, a responder UE 120 may experience local interference (e.g., after group formation) that affects the channel access availability of the responder UE 120. For example, local interference experienced by a UE may vary over time due to a mobility of a responder UE 120 in a dynamic environment, such as a responder UE 120 associated with a vehicle. Additionally, or alternatively, local interference experienced by a responder UE 120 may be persistent or periodic for responder UEs 120 in a static environment, such as a responder UE 120 associated with an RSU. As a result, the responder UE 120 may be unable to access the channel of the unlicensed spectrum and transmit a PRS during the time slot reserved by the initiator UE 120. This may reduce the reliability and accuracy of the PRS exchange procedure as the responder UE 120 may be unable to participate in the PRS exchange procedure. For example, the efficiency of a Cat 4 LBT procedure performed by an initiator UE 120 may be reduced as the initiator UE 120 may reserve CoT for a responder UE 120 that is unable to access the channel and/or transmit during the CoT. Additionally, a likelihood of failure of a Cat 2 LBT procedure (e.g., due to local interference) performed by a responder UE 120 increased.

Some techniques and apparatuses described herein enable dynamic group formation for group based PRS LBT procedures. For example, a responder UE 120 may perform a group PRS LBT procedure. The responder UE 120 may determine that the responder UE 120 should not be associated with the group based at least in part on performing the group PRS LBT procedure (e.g., based at least in part on measuring a local interference level during the group PRS LBT procedure). The responder UE 120 may indicate to the initiator UE 120 that the responder UE 120 should be removed from the group. The initiator UE 120 may remove the responder UE 120 from the group and update a list of the group members for upcoming PRS exchanges. As a result, a responder UE 120 that experiences local interference affecting the channel access availability of the responder UE 120 may voluntarily opt out of a group before the end of a group formation cycle. This improves the reliability and accuracy of the PRS exchange procedure as the responder UE 120 will not attempt to perform the LBT procedure and transmit a PRS when the responder UE 120 is unable to access the channel of the unlicensed spectrum. Moreover, this improves the efficiency of a Cat 4 LBT procedure performed by an initiator UE 120 as the initiator UE 120 will not reserve CoT for the responder UE 120 that cannot access the channel and/or transmit during the CoT. Additionally, the likelihood of an LBT failure (e.g., due to local interference) by the responder UE 120 is decreased.

Figure 5:
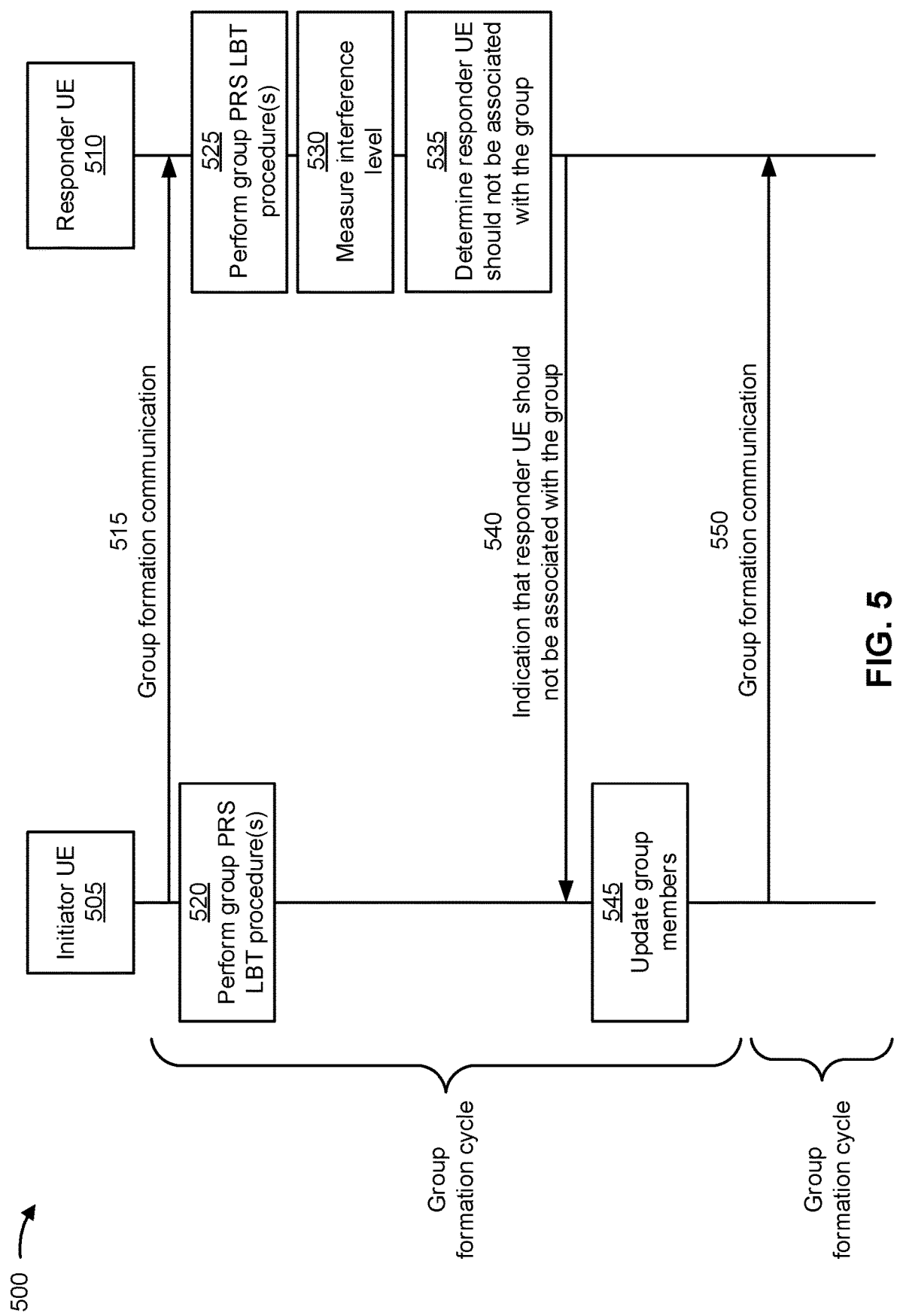
FIG. 5 is a diagram illustrating an example associated with dynamic group formation for group based positioning reference signal (PRS) listen before talk (LBT) procedures, in accordance with the present disclosure.

FIG. 5 is a diagram illustrating an example 500 associated with dynamic group formation for group based PRS LBT procedures, in accordance with the present disclosure. As shown in FIG. 5, an initiator UE 505 (e.g., a UE 120) and a responder UE 510 (e.g., another UE 120) may communicate with one another using a sidelink. The initiator UE 505 and the responder UE 510 may communicate as part of a PRS exchange procedure deployed in unlicensed spectrum. In some cases, the initiator UE 505 and the responder UE 510 may be referred to as other names, or may simply be referred to as "UEs." The PRS exchange procedure deployed in the unlicensed spectrum may include a group based LBT procedure for accessing the channel in the unlicensed spectrum prior to broadcasting PRSs on the channel.

Figure 8:
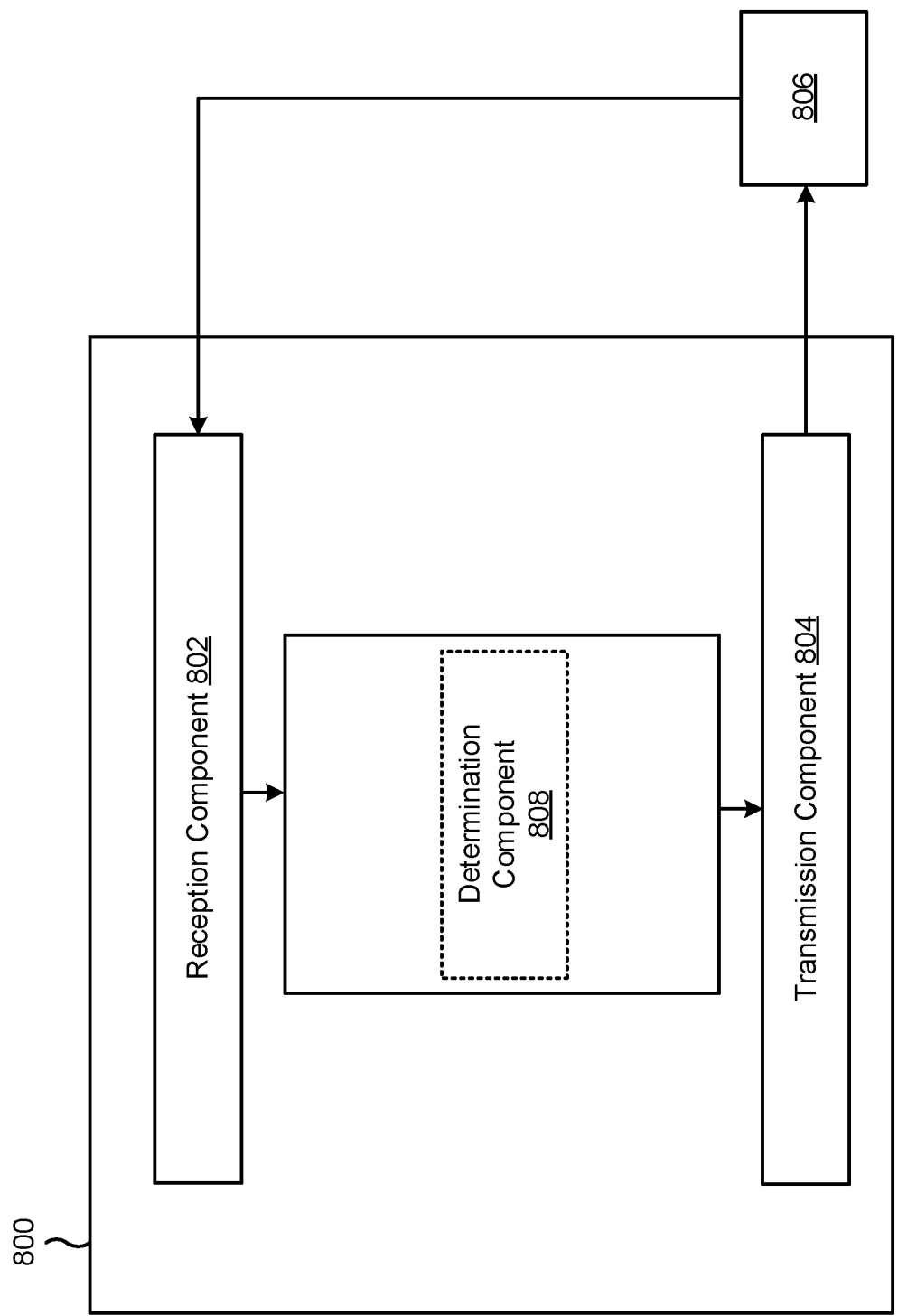
FIGS. 8 and 9 are block diagrams of example apparatuses for wireless communication, in accordance with the present disclosure.
Figure 9:
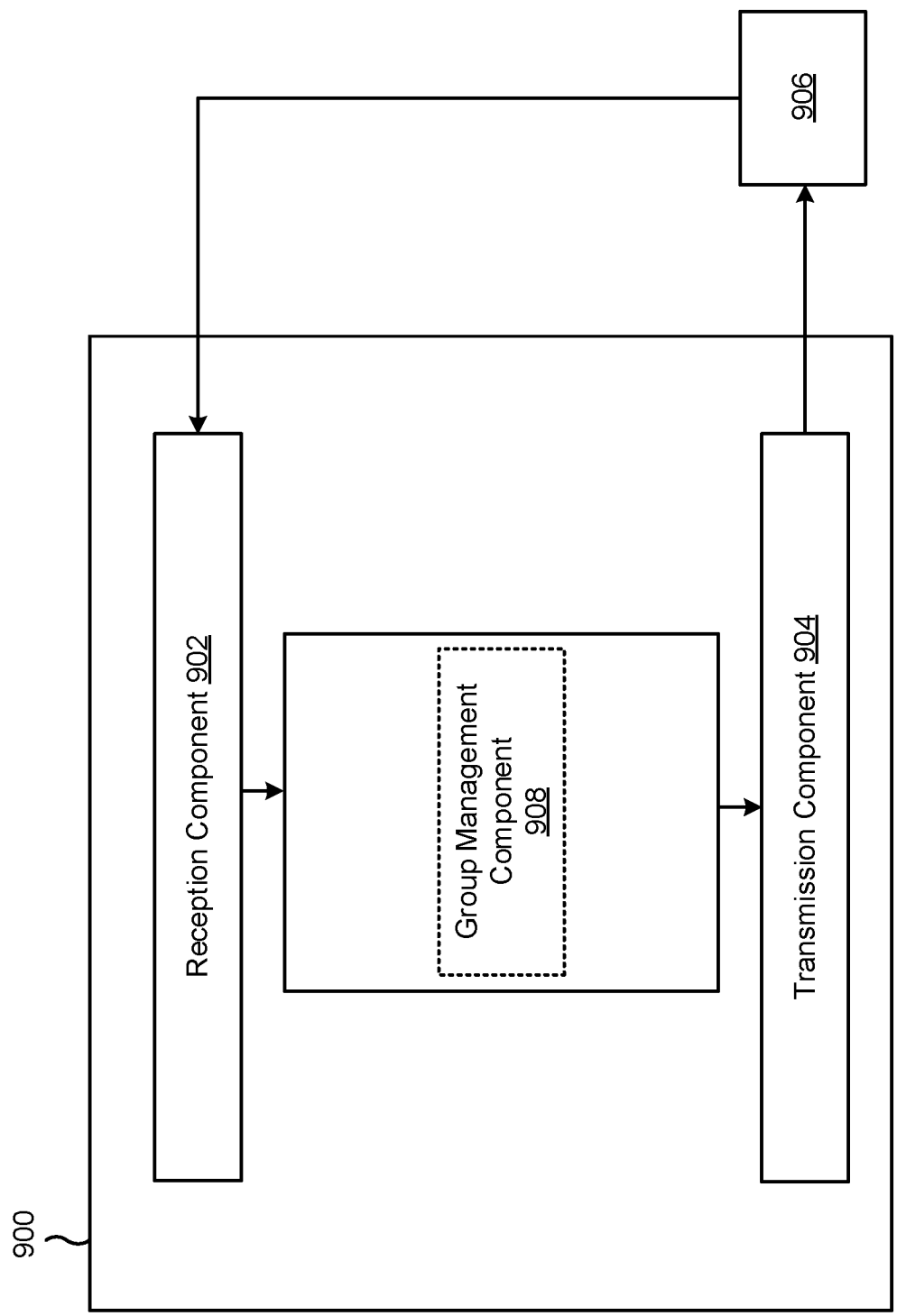

As show by reference number 515, the initiator UE 505 may transmit (e.g., using controller/processor 280, transmit processor 264, TX MIMO processor 266, MOD 254, antenna 252, memory 282, transmission component 904 depicted in FIG. 9, and/or the like), and the responder UE 510 may receive (e.g., using antenna 252, DEMOD 254, MIMO detector 256, receive processor 258, controller/processor 280, memory 282, reception component 802 depicted in FIG. 8, and/or the like), a group formation communication. The group formation communication may indicate a group that the responder UE 510 is associated with for a group PRS LBT procedure. The initiator UE 505 may transmit the group formation communication at a start of a group formation cycle. For example, groups may be formed (e.g., based at least in part on channel access availabilities of UEs 120) periodically (e.g., every 1000 milliseconds and/or the like). In some cases, the group formation communication may be referred to as another name.

As shown by reference number 520, the initiator UE 505 may perform (e.g., using controller/processor 280, transmit processor 264, TX MIMO processor 266, MOD 254, antenna 252, memory 282, antenna 252, DEMOD 254, MIMO detector 256, receive processor 258, controller/processor 280, memory 282, and/or the like) a group PRS LBT procedure. The initiator UE 505 may perform a Cat 4 LBT procedure to reserve CoT on a channel of the unlicensed spectrum for the initiator UE 505 and each responder UE 510 included in the group formed by the initiator UE 505. The initiator UE 505 may broadcast a PRS during the CoT. In some aspects, the initiator UE 505 may reserve a time slot during the CoT for the responder UE 510 to perform the group PRS LBT procedure.

In some aspects, the initiator UE 505 may perform multiple group PRS LBT procedures during a single group formation cycle. For example, a PRS exchange procedure may indicate that PRSs are to be exchanged periodically (e.g., according to a PRS exchange cycle, such as every 100 milliseconds and/or the like). Therefore, the initiator UE 505 (and the responder UEs 120 included in the group) may perform multiple PRS exchanges in the unlicensed spectrum during a single group formation cycle (e.g., multiple PRS exchange procedures associated with the same group).

As shown by reference number 525, the responder UE 510 may perform (e.g., using controller/processor 280, transmit processor 264, TX MIMO processor 266, MOD 254, antenna 252, memory 282, antenna 252, DEMOD 254, MIMO detector 256, receive processor 258, controller/processor 280, memory 282, and/or the like) a group PRS LBT procedure during a time slot reserved for the responder UE 510 by the initiator UE 505. The responder UE 510 may perform a Cat 2 LBT procedure to sense a channel availability in the unlicensed spectrum. The responder UE 510 may access the channel of the unlicensed spectrum (e.g., based at least in part on performing the Cat 2 LBT procedure) and broadcast a PRS on the channel. As described above, the responder UE 510 may perform multiple group PRS LBT procedures during a single group formation cycle. In other words, the responder UE 510 may perform multiple group PRS LBT procedures associated with the same group.

As shown by reference number 530, the responder UE 510 may measure (e.g., using antenna 252, DEMOD 254, MIMO detector 256, receive processor 258, controller/processor 280, and/or the like) a local interference level experienced by the responder UE 510. For example, the responder UE 510 may experience local interference based at least in part on receiving a communication from another wireless device, based at least in part on a nearby wireless device transmitting a communication, and/or the like. The responder UE 510 may determine a measurement value or level (e.g., an RSRP value or level) associated with the local interference.

In some aspects, the responder UE 510 may measure the local interference level experienced by the responder UE 510 for the duration of the group formation cycle. In some aspects, the responder UE 510 may measure the local interference level experienced by the responder UE 510 during the time slots reserved for the responder UE 510 by the initiator UE 505 (e.g., the time slots during which the responder UE 510 is to perform the group PRS LBT procedure) during the group formation cycle.

As shown by reference number 535, the responder UE 510 may determine (e.g., using controller/processor 280, memory 282, determination component 808 depicted in FIG. 8, and/or the like) that the responder UE 510 should not be associated with the group, based at least in part on performing the group PRS LBT procedure. For example, as described above, the responder UE 510 may measure an interference level associated with performing the group PRS LBT procedure. The responder UE 510 may determine that the responder UE 510 should not be associated with the group based at least in part on determining that the measured interference level satisfies a threshold.

In some aspects, the responder UE 510 may determine that the responder UE 510 should not be associated with the group based at least in part on experiencing high local interference. For example, the responder UE 510 may measure, for a period of time, an interference level (e.g., the RSRP of the interference) experienced by the responder UE 510. The period of time may be a period of time associated with a group formation cycle, a period of time associated with a time slot reserved for the responder UE 510 to perform a group LBT PRS procedure (e.g., during a CoT reserved by the initiator UE 505), and/or the like. The responder UE 510 may determine that the responder UE 510 should not be associated with the group based at least in part on determining that the interference level satisfies a threshold interference level (e.g., a spectrum energy detection threshold and/or the like) for a threshold amount of time during the period of time. In some aspects, the threshold amount of time during the period of time comprises a continuous amount of time (e.g., if the threshold amount of time is 25 milliseconds, the interference level must satisfy the threshold interference level for 25 consecutive milliseconds during the period of time). In some aspects, the threshold amount of time during the period of time comprises a total amount of time (e.g., if the threshold amount of time is 25 milliseconds, the interference level must satisfy the threshold interference level for 25 total milliseconds during the period of time).

In some aspects, the responder UE 510 may determine that the responder UE 510 should not be associated with the group based at least in part on experiencing periodic local interference. For example, the responder UE 510 may periodically experience interference in short bursts (e.g., that may not satisfy the threshold amount of time described above) that periodically interfere with the responder UE 510 performing the group PRS LBT procedure.

The responder UE 510 may measure, for a period of time, an interference level associated with performing the group PRS LBT procedure. As described above, the period of time may be a period of time associated with a group formation cycle, a period of time associated with a time slot reserved for the responder UE 510 to perform a group LBT PRS procedure (e.g., during a CoT reserved by the initiator UE 505), and/or the like. The responder UE 510 may determine one or more occasions during which the interference level (e.g., the RSRP of the interference experienced by the responder UE 510) satisfies a threshold interference level (e.g., a spectrum energy detection threshold and/or the like). For example, the responder UE 510 may determine one or more occasions during which the interference level satisfies a threshold interference level. The one or more occasions may occur during the time slots reserved for the responder UE 510 to perform a group LBT PRS procedure (e.g., the one or more occasions may occur over one or more PRS exchange cycles during a group formation cycle). As a result, the one or more occasions of periodic local interference may prohibit the responder UE 510 from accessing the channel in the unlicensed spectrum (e.g., due to the periodic local interference that satisfies the threshold while the responder UE 510 is attempting to access the channel).

The responder UE 510 may determine that the responder UE 510 should not be associated with the group based at least in part on determining that a quantity of the one or more occasions satisfies a threshold. For example, the responder UE 510 may determine that the periodic interference is continually or repeatedly preventing the responder UE 510 from accessing the channel in the unlicensed spectrum and/or performing the group PRS LBT procedure. As a result, the responder UE 510 may determine that the responder UE 510 should not be associated with the group.

In some aspects, the responder UE 510 may determine that the responder UE 510 should not be associated with the group based at least in part on experiencing one or more LBT failures during a group formation cycle. "LBT failure" may refer to the responder UE 510 performing an LBT procedure (e.g., a Cat 2 LBT procedure) and failing to access the channel in the unlicensed spectrum. In other words, "LBT failure" may refer to the responder UE 510 determining that the responder UE 510 is unable to transmit a PRS during a transmission period (e.g., a time slot reserved by the initiator UE 505 during a CoT) for the responder UE 510 associated with the group PRS LBT procedure.

For example, the responder UE 510 may detect, during a period of time (e.g., a group formation cycle or another period of time), one or more LBT failures associated with performing the group PRS LBT procedure. The responder UE 510 may determine that the responder UE 510 should not be associated with the group based at least in part on determining that a quantity of the one or more LBT failures satisfies a threshold. For example, a group formation cycle may be 1000 milliseconds and a PRS exchange cycle may be 100 milliseconds (e.g., the responder UE 510 may be configured to perform 10 PRS exchange procedures during a single group formation cycle). In this case, the threshold quantity of LBT failures may be 5, for example. As a result, if the responder UE 510 fails to perform a group PRS LBT procedure (e.g., fails to access the channel and/or fails to broadcast a PRS) 5 times during a single group formation cycle, the responder UE 510 may determine that the responder UE 510 should not be associated with the group.

In some aspects, the responder UE 510 may determine that the responder UE 510 should not be associated with the group based at least in part on experiencing high local interference variance. For example, the responder UE 510 may measure, for a period of time, the interference level associated with performing the group PRS LBT procedure. The responder UE 510 may determine a difference between a maximum interference level during the period of time and a minimum interference level during the period of time. The responder UE 510 may determine that the responder UE 510 should not be associated with the group based at least in part on determining that the difference between the maximum interference level during the period of time and the minimum interference level during the period of time satisfies a threshold. In other words, the responder UE 510 may determine that the responder UE 510 should not be associated with the group based at least in part on determining that the interference level (e.g., the RSRP of the interference experienced by the responder UE 510) is varying too much over a period of time, such as a group formation cycle.

In some aspects, the responder UE 510 may determine that the responder UE 510 should not be associated with the group based at least in part on determining that one or more of the above described conditions (e.g., high local interference, periodic local interference, multiple LBT failures, high variance of local interference, and/or the like) are met. In some aspects, the responder UE 510 may determine that the responder UE 510 should not be associated with the group based at least in part on determining that multiple of the above described conditions are met.

As shown by reference number 540, the responder UE 510 may transmit (e.g., using controller/processor 280, transmit processor 264, TX MIMO processor 266, MOD 254, antenna 252, memory 282, transmission component 804 depicted in FIG. 8, and/or the like), and the initiator UE 505 may receive (e.g., using antenna 252, DEMOD 254, MIMO detector 256, receive processor 258, controller/processor 280, memory 282, reception component 902 depicted in FIG. 9, and/or the like), an indication that the responder UE 510 should not be associated with the group. The responder UE 510 may transmit the indication that the responder UE 510 should not be associated with the group based at least in part on determining that the responder UE 510 should not be associated with the group, as described above. In some aspects, the responder UE 510 may broadcast the indication that the responder UE 510 should not be associated with the group.

As shown by reference number 545, the initiator UE 505 may update (e.g., using controller/processor 280, memory 282, group management component 908 depicted in FIG. 9, and/or the like) group members based at least in part on receiving the indication that the responder UE 510 should not be associated with the group. For example, the initiator UE 505 may remove the responder UE 510 from a list of group members. In some aspects, the initiator UE 505 may transmit an indication to the responder UE 510 that the responder UE 510 has been removed from the group. The initiator UE 505 may transmit (e.g., broadcast) the updated list of group members (e.g., with the responder UE 510 removed) to the remaining group members (e.g., one or more other responder UEs 510).

The initiator UE 505 and the remaining group members (if any) may continue to perform group PRS LBT procedures for the remainder of the group formation cycle. The responder UE 510 may not participate in the group PRS LBT procedures for the remainder of the group formation cycle. In some aspects, the responder UE 510 may not participate in any PRS exchange procedure for the remainder of the group formation cycle. In some aspects, the responder UE 510 may perform PRS LBT procedure(s) that are not associated with any group (e.g., that are not group based PRS LBT procedures) for the remainder of the group formation cycle.

As shown by reference number 550, at the start of a next group formation cycle, the responder UE 510 may be reinstated to the group. The initiator UE 505 may transmit (e.g., using controller/processor 280, transmit processor 264, TX MIMO processor 266, MOD 254, antenna 252, memory 282, transmission component 904 depicted in FIG. 9, and/or the like), and the responder UE 510 may receive (e.g., using antenna 252, DEMOD 254, MIMO detector 256, receive processor 258, controller/processor 280, memory 282, reception component 802 depicted in FIG. 8, and/or the like), a group formation communication. For example, at the start of the next group formation cycle, the initiator UE 505 may determine (e.g., using controller/processor 280, memory 282, group management component 908 depicted in FIG. 9, and/or the like) that the responder UE 510 is to be included in the group for the next group formation cycle. The group formation communication may indicate that the responder UE 510 is associated with the group (e.g., the group that the responder UE 510 opted out of during the previous group formation cycle) for the upcoming group formation cycle.

In some aspects, the responder UE 510 may determine that it should not be associated with the group again during the upcoming group formation cycle (e.g., in a similar manner as described above). In some aspects, when the responder UE 510 opts out of a same group over multiple group formation cycles, the responder UE 510 may be prevented from joining that group during future group formation cycles. For example, the responder UE 510 may transmit one or more additional indications, to the initiator UE 505, over one or more group formation cycles, that the responder UE 510 should not be associated with the group. The initiator UE 505 may determine (e.g., using controller/processor 280, memory 282, group management component 908 depicted in FIG. 9, and/or the like) that a quantity of the one or more additional indications satisfies a threshold. The initiator UE 505 may refrain from including the responder UE 510 in the group during future group formation cycles based at least in part on determining that the quantity of the one or more additional indications satisfies the threshold.

In that case, the responder UE 510 may join a different group for future group formation cycles. For example, the responder UE 510 may receive (e.g., using antenna 252, DEMOD 254, MIMO detector 256, receive processor 258, controller/processor 280, memory 282, reception component 802 depicted in FIG. 8, and/or the like), from a different initiator UE 505, a group formation communication indicating a different group that the UE is associated with for a group PRS LBT procedure. The responder UE 510 may perform a group PRS LBT procedure associated with the different group. In some aspects, the responder UE 510 may not join a group for future group formation cycles. For example, the responder UE 510 may perform an LBT procedure without being associated with a group (e.g., may perform a non-group based LBT procedure to access the channel in the unlicensed spectrum and broadcast a PRS after accessing the channel). In that case, the responder UE 510 may not be active during a group formation period (e.g., the responder UE 510 may not respond to group formation communications from one or more initiator UEs 505).

As a result, a responder UE 510 that experiences local interference affecting the channel access availability of the responder UE 510 may voluntarily opt out of a group before the end of a group formation cycle. This improves the reliability and accuracy of the PRS exchange procedure as the responder UE 510 will not attempt to perform the LBT procedure and transmit a PRS when the responder UE 510 is unable to access the channel of the unlicensed spectrum. Moreover, this improves the efficiency of a Cat 4 LBT procedure performed by an initiator UE 505 as the initiator UE 505 will not reserve CoT for the responder UE 510 that cannot access the channel and/or transmit during the CoT. Additionally, the likelihood of an LBT failure (e.g., due to local interference) by the responder UE 510 is decreased.

As indicated above, FIG. 5 is provided as an example. Other examples may differ from what is described with respect to FIG. 5.

Figure 6:
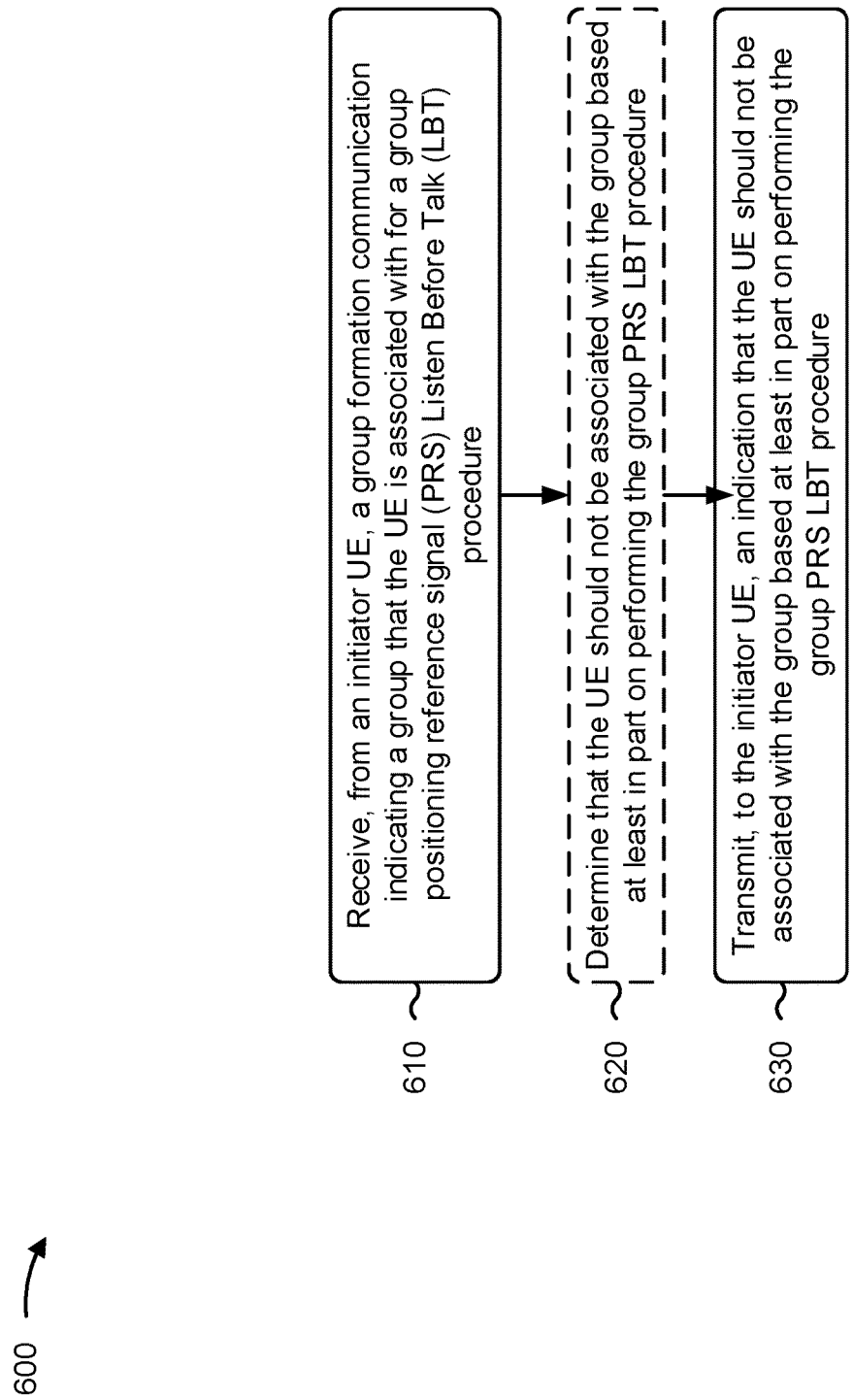
FIGS. 6 and 7 are diagrams illustrating example processes associated with dynamic group formation for group based PRS LBT procedures, in accordance with the present disclosure.

FIG. 6 is a diagram illustrating an example process 600 performed, for example, by a UE, in accordance with the present disclosure. Example process 600 is an example where the UE (e.g., UE 120, the responder UE 510, and/or the like) performs operations associated with dynamic group formation for group based PRS LBT procedures.

As shown in FIG. 6, in some aspects, process 600 may include receiving, from an initiator UE, a group formation communication indicating a group that the UE is associated with for a group PRS LBT procedure (block 610). For example, the UE (e.g., using antenna 252, demodulator 254, MIMO detector 256, receive processor 258, controller/ processor 280, memory 282, and/or using reception component 802 depicted in FIG. 8) may receive, from an initiator UE, a group formation communication indicating a group that the UE is associated with for a group PRS LBT procedure, as described above.

As further shown in FIG. 6, in some aspects, process 600 may optionally include determining that the UE should not be associated with the group based at least in part on performing the group PRS LBT procedure (block 620). For example, the UE (e.g., using antenna 252, demodulator 254, MIMO detector 256, receive processor 258, transmit processor 264, TX MIMO processor 266, modulator 254, controller/processor 280, memory 282, and/or using determination component 808 depicted in FIG. 8) may determine that the UE should not be associated with the group based at least in part on performing the group PRS LBT procedure, as described above.

As further shown in FIG. 6, in some aspects, process 600 may include transmitting, to the initiator UE, an indication that the UE should not be associated with the group based at least in part on performing the group PRS LBT procedure (block 630). For example, the UE (e.g., using antenna 252, transmit processor 264, TX MIMO processor 266, modulator 254, controller/processor 280, memory 282, and/or using transmission component 804 depicted in FIG. 8) may transmit, to the initiator UE, an indication that the UE should not be associated with the group based at least in part on performing the group PRS LBT procedure, as described above.

Process 600 may include additional aspects, such as any single aspect or any combination of aspects described below and/or in connection with one or more other processes described elsewhere herein.

In a first aspect, performing the group PRS LBT procedure comprises performing a PRS exchange procedure in an unlicensed spectrum.

In a second aspect, alone or in combination with the first aspect, transmitting the indication that the UE should not be associated with the group comprises measuring an interference level associated with performing the group PRS LBT procedure, and transmitting the indication that the UE should not be associated with the group if the interference level satisfies a threshold.

In a third aspect, alone or in combination with one or more of the first and second aspects, transmitting the indication that the UE should not be associated with the group comprises measuring, for a period of time, an interference level associated with performing the group PRS LBT procedure, and transmitting the indication that the UE should not be associated with the group if the interference level satisfies a threshold interference level for a threshold amount of time during the period of time.

In a fourth aspect, alone or in combination with one or more of the first through third aspects, transmitting the indication that the UE should not be associated with the group comprises measuring, for a period of time, an interference level associated with performing the group PRS LBT procedure, determining one or more occasions during which the interference level satisfies a threshold interference level, and transmitting the indication that the UE should not be associated with the group if a quantity of the one or more occasions satisfies a threshold.

In a fifth aspect, alone or in combination with one or more of the first through fourth aspects, transmitting the indication that the UE should not be associated with the group comprises detecting, during a period of time, one or more LBT failures associated with performing the group PRS LBT procedure, and transmitting the indication that the UE should not be associated with the group if a quantity of the one or more LBT failures satisfies a threshold.

In a sixth aspect, alone or in combination with one or more of the first through fifth aspects, detecting an LBT failure, of the one or more LBT failures, comprises determining that the UE is unable to transmit a PRS during a transmission period for the UE associated with the group PRS LBT procedure.

In a seventh aspect, alone or in combination with one or more of the first through sixth aspects, transmitting the indication that the UE should not be associated with the group comprises measuring, for a period of time, an interference level associated with performing the group PRS LBT procedure, determining a difference between a maximum interference level during the period of time and a minimum interference level during the period of time, and transmitting the indication that the UE should not be associated with the group if the difference between the maximum interference level during the period of time and the minimum interference level during the period of time satisfies a threshold.

In an eighth aspect, alone or in combination with one or more of the first through seventh aspects, process 600 includes receiving, from the initiator UE, an indication that the UE is no longer associated with the group based at least in part on transmitting the indication that the UE should not be associated with the group.

In a ninth aspect, alone or in combination with one or more of the first through eighth aspects, process 600 includes receiving, from the initiator UE, another group formation communication indicating that the UE is associated with the group for a group PRS LBT procedure during an upcoming group formation cycle.

In a tenth aspect, alone or in combination with one or more of the first through ninth aspects, process 600 includes transmitting, to the initiator UE over one or more group formation cycles, one or more additional indications that the UE should not be associated with the group after the UE has been reinstated to the group.

In an eleventh aspect, alone or in combination with one or more of the first through tenth aspects, process 600 includes receiving, from a different initiator UE, a group formation communication indicating a different group that the UE is associated with for a group PRS LBT procedure based at least in part on a quantity of the one or more additional indications that the UE should not be associated with the group satisfying a threshold, or performing an LBT procedure without being associated with a group based at least in part on a quantity of the one or more additional indications that the UE should not be associated with the group satisfying the threshold.

In a twelfth aspect, alone or in combination with one or more of the first through eleventh aspects, performing the group PRS LBT procedure comprises performing a category 2 LBT procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
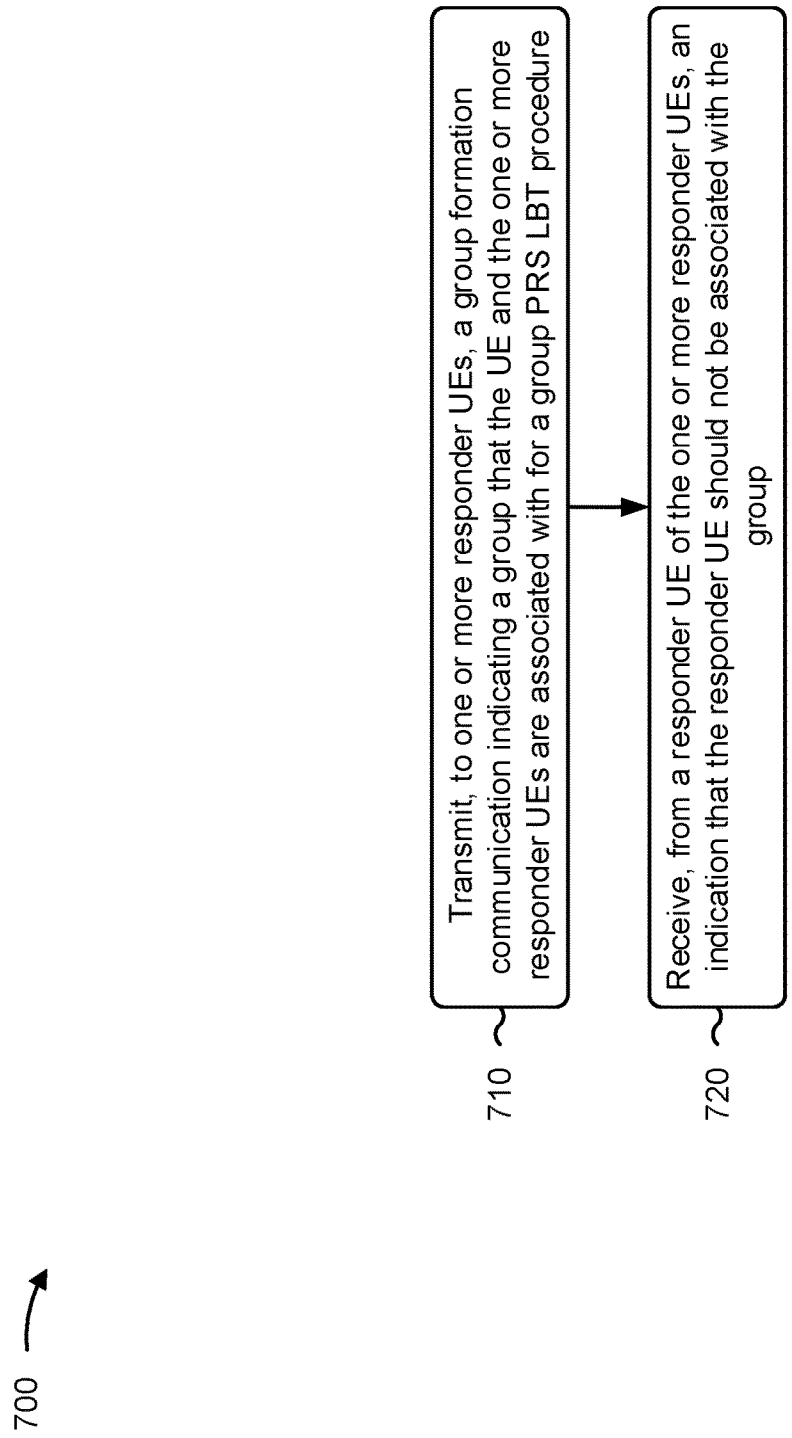

FIG. 7 is a diagram illustrating an example process 700 performed, for example, by a UE, in accordance with the present disclosure. Example process 700 is an example where the UE (e.g., UE 120, the initiator UE 505, and/or the like) performs operations associated with dynamic group formation for group based PRS LBT procedures.

As shown in FIG. 7, in some aspects, process 700 may include transmitting, to one or more responder UEs, a group formation communication indicating a group that the UE and the one or more responder UEs are associated with for a group PRS LBT procedure (block 710). For example, the UE (e.g., using antenna 252, transmit processor 264, TX MIMO processor 266, modulator 254, controller/processor 280, memory 282, and/or transmission component 904 depicted in FIG. 9) may transmit, to one or more responder UEs, a group formation communication indicating a group that the UE and the one or more responder UEs are associated with for a group PRS LBT procedure, as described above.

As further shown in FIG. 7, in some aspects, process 700 may include receiving, from a responder UE of the one or more responder UEs, an indication that the responder UE should not be associated with the group (block 720). For example, the UE (e.g., using antenna 252, demodulator 254, MIMO detector 256, receive processor 258, controller/processor 280, memory 282, and/or reception component 902 depicted in FIG. 9) may receive, from a responder UE of the one or more responder UEs, an indication that the responder UE should not be associated with the group, as described above.

Process 700 may include additional aspects, such as any single aspect or any combination of aspects described below and/or in connection with one or more other processes described elsewhere herein.

In a first aspect, process 700 includes performing a PRS exchange procedure in an unlicensed spectrum associated with the group PRS LBT procedure.

In a second aspect, alone or in combination with the first aspect, the indication that the responder UE should not be associated with the group is based at least in part on an interference level measured by the responder UE, when performing the group PRS LBT procedure, satisfying a threshold.

In a third aspect, alone or in combination with one or more of the first and second aspects, the indication that the responder UE should not be associated with the group is based at least in part on an interference level, measured by the responder UE when performing the group PRS LBT procedure, satisfying a threshold interference level for a threshold amount of time during a period of time.

In a fourth aspect, alone or in combination with one or more of the first through third aspects, the indication that the responder UE should not be associated with the group is based at least in part on a quantity of occasions, during which an interference level measured by the responder UE satisfies a threshold interference level during a period of time, satisfying a threshold.

In a fifth aspect, alone or in combination with one or more of the first through fourth aspects, the indication that the responder UE should not be associated with the group is based at least in part on a quantity of LBT failures experienced by the responder UE during a period of time satisfying a threshold.

In a sixth aspect, alone or in combination with one or more of the first through fifth aspects, the indication that the responder UE should not be associated with the group is based at least in part on a difference between a maximum interference level measured by the responder UE during a period of time, and a minimum interference level measured by the responder UE during the period of time, satisfying a threshold.

In a seventh aspect, alone or in combination with one or more of the first through sixth aspects, process 700 includes transmitting, to the responder UE, an indication that the UE is no longer associated with the group based at least in part on receiving the indication that the UE should not be associated with the group.

In an eighth aspect, alone or in combination with one or more of the first through seventh aspects, process 700 includes removing the responder UE from the one or more responder UEs associated with the group, and transmitting, to the one or more responder UEs associated with the group, an updated list of UEs associated with the group.

In a ninth aspect, alone or in combination with one or more of the first through eighth aspects, process 700 includes determining that the responder UE is to be included in the group for an upcoming group formation cycle, and transmitting, to the responder UE, another group formation communication indicating that the responder UE is associated with the group for a group PRS LBT procedure during the upcoming group formation cycle.

In a tenth aspect, alone or in combination with one or more of the first through ninth aspects, process 700 includes receiving, from the responder UE over one or more group formation cycles, one or more additional indications that the responder UE should not be associated with the group after being reinstated to the group, and determining that a quantity of the one or more additional indications that the responder UE should not be associated with the group after being reinstated to the group satisfies a threshold.

In an eleventh aspect, alone or in combination with one or more of the first through tenth aspects, process 700 includes refraining from including the responder UE in the group during upcoming group formation cycles based at least in part on determining that the quantity of the one or more additional indications that the responder UE should not be associated with the group after being reinstated to the group satisfies the threshold.

In a twelfth aspect, alone or in combination with one or more of the first through eleventh aspects, process 700 includes performing a category 4 LBT procedure associated with the group PRS LBT procedure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a block diagram of an example apparatus 800 for wireless communication. The apparatus 800 may be a UE, or a UE may include the apparatus 800. In some aspects, the UE may be a responder UE, as described above. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The reception component 802 may receive, from an initiator UE, a group formation communication indicating a group that the UE is associated with for a group PRS LBT procedure. In some aspects, the determination component 808 may determine that the UE should not be associated with the group based at least in part on performing the group PRS LBT procedure. In some aspects, the determination component 808 may include a receive processor, a transmit MIMO processor, a transmit processor, a controller/processor, a memory, or a combination thereof, of the UE described above in connection with FIG. 2. The transmission component 804 may transmit, to the initiator UE, an indication that the UE should not be associated with the group.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a block diagram of an example apparatus 900 for wireless communication. The apparatus 900 may be a UE, or a UE may include the apparatus 900. In some aspects, the UE may be an initiator UE, as described above. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a group management component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The transmission component 904 may transmit, to one or more responder UEs, a group formation communication indicating a group that the UE and the one or more responder UEs are associated with for a group PRS LBT procedure. The reception component 902 may receive, from a responder UE of the one or more responder UEs, an indication that the responder UE should not be associated with the group. The group management component 908 may remove the responder UE from the one or more responder UEs associated with the group. The group management component 908 may determine that the responder UE is to be included in the group for an upcoming group formation cycle. In some aspects, the group management component 908 may include a receive processor, a transmit MIMO processor, a transmit processor, a controller/processor, a memory, or a combination thereof, of the UE described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from an initiator UE, a group formation communication indicating a group that the UE is associated with for a group positioning reference signal (PRS) Listen Before Talk (LBT) procedure; and transmitting, to the initiator UE, an indication that the UE should not be associated with the group based at least in part on performing the group PRS LBT procedure.

Aspect 2: The method of Aspect 1, wherein performing the group PRS LBT procedure comprises performing a PRS exchange procedure in an unlicensed spectrum.

Aspect 3: The method of any of Aspects 1-2, wherein transmitting the indication that the UE should not be associated with the group comprises: measuring an interference level associated with performing the group PRS LBT procedure; and transmitting the indication that the UE should not be associated with the group if the interference level satisfies a threshold.

Aspect 4: The method of any of Aspects 1-3, wherein transmitting the indication that the UE should not be associated with the group comprises: measuring, for a period of time, an interference level associated with performing the group PRS LBT procedure; and transmitting the indication that the UE should not be associated with the group if the interference level satisfies a threshold interference level for a threshold amount of time during the period of time.

Aspect 5: The method of any of Aspects 1-4, wherein transmitting the indication that the UE should not be associated with the group comprises: measuring, for a period of time, an interference level associated with performing the group PRS LBT procedure; determining one or more occasions during which the interference level satisfies a threshold interference level; and transmitting the indication that the UE should not be associated with the group if a quantity of the one or more occasions satisfies a threshold.

Aspect 6: The method of any of Aspects 1-5, wherein transmitting the indication that the UE should not be associated with the group comprises: detecting, during a period of time, one or more LBT failures associated with performing the group PRS LBT procedure; and transmitting the indication that the UE should not be associated with the group if a quantity of the one or more LBT failures satisfies a threshold.

Aspect 7: The method of Aspect 6, wherein detecting an LBT failure, of the one or more LBT failures, comprises: determining that the UE is unable to transmit a PRS during a transmission period for the UE associated with the group PRS LBT procedure.

Aspect 8: The method of any of Aspects 1-7, wherein transmitting the indication that the UE should not be associated with the group comprises: measuring, for a period of time, an interference level associated with performing the group PRS LBT procedure; determining a difference between a maximum interference level during the period of time and a minimum interference level during the period of time; and transmitting the indication that the UE should not be associated with the group if the difference between the maximum interference level during the period of time and the minimum interference level during the period of time satisfies a threshold.

Aspect 9: The method of any of Aspects 1-8, further comprising: receiving, from the initiator UE, an indication that the UE is no longer associated with the group based at least in part on transmitting the indication that the UE should not be associated with the group.

Aspect 10: The method of any of Aspects 1-9, further comprising: receiving, from the initiator UE, another group formation communication indicating that the UE is associated with the group for a group PRS LBT procedure during an upcoming group formation cycle.

Aspect 11: The method of any of Aspects 1-10, further comprising: transmitting, to the initiator UE over one or more group formation cycles, one or more additional indications that the UE should not be associated with the group after the UE has been reinstated to the group.

Aspect 12: The method of Aspect 11, further comprising: receiving, from a different initiator UE, a group formation communication indicating a different group that the UE is associated with for a group PRS LBT procedure based at least in part on a quantity of the one or more additional indications that the UE should not be associated with the group satisfying a threshold; or performing an LBT procedure without being associated with a group based at least in part on a quantity of the one or more additional indications that the UE should not be associated with the group satisfying the threshold.

Aspect 13: The method of any of Aspects 1-12, wherein performing the group PRS LBT procedure comprises performing a category 2 LBT procedure.

Aspect 14: A method of wireless communication performed by a user equipment (UE), comprising: transmitting, to one or more responder UEs, a group formation communication indicating a group that the UE and the one or more responder UEs are associated with for a group positioning reference signal (PRS) Listen Before Talk (LBT) procedure; and receiving, from a responder UE of the one or more responder UEs, an indication that the responder UE should not be associated with the group.

Aspect 15: The method of Aspect 14, further comprising: performing a PRS exchange procedure in an unlicensed spectrum associated with the group PRS LBT procedure.

Aspect 16: The method of any of Aspects 14-15, wherein the indication that the responder UE should not be associated with the group is based at least in part on an interference level measured by the responder UE, when performing the group PRS LBT procedure, satisfying a threshold.

Aspect 17: The method of any of Aspects 14-16, wherein the indication that the responder UE should not be associated with the group is based at least in part on an interference level, measured by the responder UE when performing the group PRS LBT procedure, satisfying a threshold interference level for a threshold amount of time during a period of time.

Aspect 18: The method of any of Aspects 14-17, wherein the indication that the responder UE should not be associated with the group is based at least in part on a quantity of occasions, during which an interference level measured by the responder UE satisfies a threshold interference level during a period of time, satisfying a threshold.

Aspect 19: The method of any of Aspects 14-18, wherein the indication that the responder UE should not be associated with the group is based at least in part on a quantity of LBT failures experienced by the responder UE during a period of time satisfying a threshold.

Aspect 20: The method of any of Aspects 14-19, wherein the indication that the responder UE should not be associated with the group is based at least in part on a difference between a maximum interference level measured by the responder UE during a period of time and a minimum interference level measured by the responder UE during the period of time satisfying a threshold.

Aspect 21: The method of any of Aspects 14-20, further comprising: transmitting, to the responder UE, an indication that the UE is no longer associated with the group based at least in part on receiving the indication that the UE should not be associated with the group.

Aspect 22: The method of any of Aspects 14-21, further comprising: removing the responder UE from the one or more responder UEs associated with the group; and transmitting, to the one or more responder UEs associated with the group, an updated list of UEs associated with the group.

Aspect 23: The method of any of Aspects 14-22, further comprising: determining that the responder UE is to be included in the group for an upcoming group formation cycle; and transmitting, to the responder UE, another group formation communication indicating that the responder UE is associated with the group for a group PRS LBT procedure during the upcoming group formation cycle.

Aspect 24: The method of any of Aspects 14-23, further comprising: receiving, from the responder UE over one or more group formation cycles, one or more additional indications that the responder UE should not be associated with the group after being reinstated to the group; and determining that a quantity of the one or more additional indications that the responder UE should not be associated with the group after being reinstated to the group satisfies a threshold.

Aspect 25: The method of Aspect 24, further comprising: refraining from including the responder UE in the group during upcoming group formation cycles based at least in part on determining that the quantity of the one or more additional indications that the responder UE should not be associated with the group after being reinstated to the group satisfies the threshold.

Aspect 26: The method of any of Aspects 14-25, further comprising: performing a category 4 LBT procedure associated with the group PRS LBT procedure.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 32: An apparatus for wireless communication at a device, comprising a processor; memory coupled with the processor; and instructions stored in the memory and executable by the processor to cause the apparatus to perform the method of one or more of Aspects 14-26.

Aspect 33: A device for wireless communication, comprising a memory and one or more processors coupled to the memory, the one or more processors configured to perform the method of one or more of Aspects 14-26.

Aspect 34: An apparatus for wireless communication, comprising at least one means for performing the method of one or more of Aspects 14-26.

Aspect 35: A non-transitory computer-readable medium storing code for wireless communication, the code comprising instructions executable by a processor to perform the method of one or more of Aspects 14-26.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from an initiator UE, a group formation communication indicating a group that the UE is associated with for a group positioning reference signal (PRS) Listen Before Talk (LBT) procedure; and
   transmitting, to the initiator UE, an indication that the UE should not be associated with the group based at least in part on performing the group PRS LBT procedure.

2. The method of claim 1, wherein transmitting the indication that the UE should not be associated with the group comprises:
   measuring an interference level associated with performing the group PRS LBT procedure; and
   transmitting the indication that the UE should not be associated with the group if the interference level satisfies a threshold.

3. The method of claim 1, wherein transmitting the indication that the UE should not be associated with the group comprises:
   measuring, for a period of time, an interference level associated with performing the group PRS LBT procedure; and
   transmitting the indication that the UE should not be associated with the group if the interference level satisfies a threshold interference level for a threshold amount of time during the period of time.

4. The method of claim 1, wherein transmitting the indication that the UE should not be associated with the group comprises:
   measuring, for a period of time, an interference level associated with performing the group PRS LBT procedure;
   determining one or more occasions during which the interference level satisfies a threshold interference level; and
   transmitting the indication that the UE should not be associated with the group if a quantity of the one or more occasions satisfies a threshold.

5. The method of claim 1, wherein transmitting the indication that the UE should not be associated with the group comprises:
   detecting, during a period of time, one or more LBT failures associated with performing the group PRS LBT procedure; and
   transmitting the indication that the UE should not be associated with the group if a quantity of the one or more LBT failures satisfies a threshold.

6. The method of claim 1, wherein transmitting the indication that the UE should not be associated with the group comprises:
   measuring, for a period of time, an interference level associated with performing the group PRS LBT procedure;
   determining a difference between a maximum interference level during the period of time and a minimum interference level during the period of time; and
   transmitting the indication that the UE should not be associated with the group if the difference between the maximum interference level during the period of time and the minimum interference level during the period of time satisfies a threshold.

7. The method of claim 1, further comprising:
receiving, from the initiator UE, an indication that the UE is no longer associated with the group based at least in part on transmitting the indication that the UE should not be associated with the group.

8. The method of claim 1, further comprising:
receiving, from the initiator UE, another group formation communication indicating that the UE is associated with the group for a group PRS LBT procedure during an upcoming group formation cycle.

9. The method of claim 1, further comprising:
transmitting, to the initiator UE over one or more group formation cycles, one or more additional indications that the UE should not be associated with the group after the UE has been reinstated to the group.

10. The method of claim 9, further comprising:
receiving, from a different initiator UE, another group formation communication indicating a different group that the UE is associated with for the group PRS LBT procedure based at least in part on a quantity of the one or more additional indications that the UE should not be associated with the group satisfying a threshold; or
performing an LBT procedure without being associated with a group based at least in part on a quantity of the one or more additional indications that the UE should not be associated with the group satisfying the threshold.

11. A method of wireless communication performed by a user equipment (UE), comprising:
transmitting, to one or more responder UEs, a group formation communication indicating a group that the UE and the one or more responder UEs are associated with for a group positioning reference signal (PRS) Listen Before Talk (LBT) procedure; and
receiving, from a responder UE of the one or more responder UEs, an indication that the responder UE should not be associated with the group.

12. The method of claim 11, further comprising:
transmitting, to the responder UE, an indication that the UE is no longer associated with the group based at least in part on receiving the indication that the UE should not be associated with the group.

13. The method of claim 11, further comprising:
removing the responder UE from the one or more responder UEs associated with the group; and
transmitting, to the one or more responder UEs associated with the group, an updated list of UEs associated with the group.

14. The method claim 11, further comprising:
determining that the responder UE is to be included in the group for an upcoming group formation cycle; and
transmitting, to the responder UE, another group formation communication indicating that the responder UE is associated with the group for a group PRS LBT procedure during the upcoming group formation cycle.

15. The method of claim 11, further comprising:
receiving, from the responder UE over one or more group formation cycles, one or more additional indications that the responder UE should not be associated with the group after being reinstated to the group; and
refraining from including the responder UE in the group during upcoming group formation cycles based at least in part on a quantity of the one or more additional indications that the responder UE should not be associated with the group after being reinstated to the group satisfying a threshold.

16. A user equipment (UE) for wireless communication, comprising:
a memory; and
one or more processors, coupled to the memory, configured to:
receive, from an initiator UE, a group formation communication indicating a group that the UE is associated with for a group positioning reference signal (PRS) Listen Before Talk (LBT) procedure; and
transmit, to the initiator UE, an indication that the UE should not be associated with the group based at least in part on performing the group PRS LBT procedure.

17. The UE of claim 16, wherein the one or more processors, to transmit the indication that the UE should not be associated with the group, are configured to:
measure an interference level associated with performing the group PRS LBT procedure; and
transmit the indication that the UE should not be associated with the group if the interference level satisfies a threshold.

18. The UE of claim 16, wherein the one or more processors, to transmit the indication that the UE should not be associated with the group, are configured to:
measure, for a period of time, an interference level associated with performing the group PRS LBT procedure; and
transmit the indication that the UE should not be associated with the group if the interference level satisfies a threshold interference level for a threshold amount of time during the period of time.

19. The UE of claim 16, wherein the one or more processors, to transmit the indication that the UE should not be associated with the group, are configured to:
measure, for a period of time, an interference level associated with performing the group PRS LBT procedure;
determine one or more occasions during which the interference level satisfies a threshold interference level; and
transmit the indication that the UE should not be associated with the group if a quantity of the one or more occasions satisfies a threshold.

20. The UE of claim 16, wherein the one or more processors, to transmit the indication that the UE should not be associated with the group, are configured to:
detect, during a period of time, one or more LBT failures associated with performing the group PRS LBT procedure; and
transmit the indication that the UE should not be associated with the group if a quantity of the one or more LBT failures satisfies a threshold.

21. The UE of claim 16, wherein the one or more processors, to transmit the indication that the UE should not be associated with the group, are configured to:
measure, for a period of time, an interference level associated with performing the group PRS LBT procedure;
determine a difference between a maximum interference level during the period of time and a minimum interference level during the period of time; and
transmit the indication that the UE should not be associated with the group if the difference between the maximum interference level during the period of time and the minimum interference level during the period of time satisfies a threshold.

22. The UE of claim 16, wherein the one or more processors are further configured to:
receive, from the initiator UE, an indication that the UE is no longer associated with the group based at least in part on transmitting the indication that the UE should not be associated with the group.

23. The UE of claim 16, wherein the one or more processors are further configured to:
receive, from the initiator UE, another group formation communication indicating that the UE is associated with the group for a group PRS LBT procedure during an upcoming group formation cycle.

24. The UE of claim 16, wherein the one or more processors are further configured to:
transmit, to the initiator UE over one or more group formation cycles, one or more additional indications that the UE should not be associated with the group after the UE has been reinstated to the group.

25. The UE of claim 24, wherein the one or more processors are further configured to:
receive, from a different initiator UE, another group formation communication indicating a different group that the UE is associated with for the group PRS LBT procedure based at least in part on a quantity of the one or more additional indications that the UE should not be associated with the group satisfying a threshold; or
perform an LBT procedure without being associated with a group based at least in part on a quantity of the one or more additional indications that the UE should not be associated with the group satisfying the threshold.

26. A UE for wireless communication, comprising:
a memory; and
one or more processors, coupled to the memory, configured to:
transmit, to one or more responder UEs, a group formation communication indicating a group that the UE and the one or more responder UEs are associated with for a group positioning reference signal (PRS) Listen Before Talk (LBT) procedure; and
receive, from a responder UE of the one or more responder UEs, an indication that the responder UE should not be associated with the group.

27. The UE of claim 26, wherein the one or more processors are further configured to:
transmit, to the responder UE, an indication that the UE is no longer associated with the group based at least in part on receiving the indication that the UE should not be associated with the group.

28. The UE of claim 26, wherein the one or more processors are further configured to:
remove the responder UE from the one or more responder UEs associated with the group; and
transmit, to the one or more responder UEs associated with the group, an updated list of UEs associated with the group.

29. The UE of claim 26, wherein the one or more processors are further configured to:
determine that the responder UE is to be included in the group for an upcoming group formation cycle; and
transmit, to the responder UE, another group formation communication indicating that the responder UE is associated with the group for a group PRS LBT procedure during the upcoming group formation cycle.

30. The UE of claim 26, wherein the one or more processors are further configured to:
receive, from the responder UE over one or more group formation cycles, one or more additional indications that the responder UE should not be associated with the group after being reinstated to the group; and
refrain from including the responder UE in the group during upcoming group formation cycles based at least in part on a quantity of the one or more additional indications that the responder UE should not be associated with the group after being reinstated to the group satisfying a threshold.

* * * * *